United States Patent Office 3,418,070
Patented Dec. 24, 1968

3,418,070
COMPOSITIONS AND PROCESSES FOR
TREATING EXHAUST
James F. Roth, St. Louis, Mo., assignor to Monsanto
Chemical Company, St. Louis, Mo., a corporation of
Delaware
No Drawing. Filed June 20, 1963, Ser. No. 289,393
14 Claims. (Cl. 23—2)

ABSTRACT OF THE DISCLOSURE

A catalytic composition and a process for the catalytic oxidation of exhaust gases from an automobile combustion engine where the exhaust is passed over a catalytic composite which comprises an active copper oxide component which is contained on an alumina base and which has a crystalline content of less than 2% based on the weight of the composite. Furthermore, the catalytic composite has a macropore volume determined by the mercury penetration method of about 0.05 to 0.30 cubic centimeter per gram.

---

My invention relates to systems for treating exhaust employing catalysts having improved stability and useful life under practical conditions and particularly concerns catalysts that exhibit superior resistance to inactivation as well as to degradation.

It has long been known that hydrocarbon combustion engines release substantial quantities of toxic, obnoxious, and otherwise undesirable materials in their exhaust.

Of the toxic materials carbon monoxide is one of the most deadly. Thus, amounts as small as 0.10 volume percent of carbon monoxide in the atmosphere are dangerous to life and lethal amounts can, without realization, be inhaled and combined with blood hemoglobin before its effects are evident.

Other combustion products include by way of example unburned fuel hydrocarbons, both saturated and unsaturated; partial oxidation products such as organic acids aldehydes, ketones, and alcohols; and various oxides of nitrogen and sulfur. In any particular case the composition of engine exhaust depends on the engine type as well as load, speed, fuel burned in the engine, etc.

In recent years the correlation between the presence of unburned fuel hydrocarbons in the atmosphere and the production of so-called smog conditions has been established with some certainty and smog irritants are believed to be the result of a gaseous phase photochemical reaction in which unburned fuel hydrocarbons and nitrogen oxides in the atmosphere are prime contributory factors.

Considerable work has been directed toward the development of an oxidation catalyst capable of oxidizing carbon monoxide, hydrocarbons, and other oxidizable constituents present in exhaust. Compositions containing copper, nickel, cobalt, iron, maganese, and other metals on various supports have been proposed.

Their usefulness under practical conditions however suffers from inadequate life due to physical breakup, inactivation, lead poisoning, etc.

In my copending application Ser. No. 219,117, filed Aug. 24, 1962 now abandoned, I disclosed processes for treating exhaust utilizing catalytically active metallic components having a low crystalline content. These catalysts are resistant to degradation under road test conditions, whether exposed to exhausts of leaded or non-leaded fuels and irrespective of the composition of the exhaust or the addition of secondary air. Low crystalline content catalysts resistant to degradation are, however, susceptible to inactivation. Thus, after aging their activity declines to levels that are marginal or inadequate.

It is the primary object of the present invention to provide improved catalysts for oxidizing exhaust from hydrocarbon combustion engines and specifically to provide catalysts for treating exhaust which have superior resistance to inactivation as well as to degradation.

This primary object and other secondary objectives, which are presented in the following detailed description, have been attained by using catalytic composites comprising a catalytically active copper component contained on a suitable base which catalytically active component has a low crystalline content and where the catalytic composite has an appreciable macropore volume.

The active copper can be present as copper metal, as various copper compounds, or as any combination thereof. Of these copper oxide is generally the most convenient form to use.

Suitable catalyst bases, i.e., supports, are generally porous, thermally stable, inorganic oxides. Typical bases include, for example, alumina, silica, boria, zirconia, hafnia, titania, etc. Of these alumina is much preferred as being both an excellent and inexpensive support.

The term "low crystalline content" means that the catalytic composite contains the catalytically active copper component in less than about four weight percent and, preferably, in less than about two weight percent of the total composite, as determined by standard X-ray diffraction techniques.

Crystalline material detected by X-ray diffraction is usually at least about 50 A. in diameter and the term "crystalline" as used herein is so defined. Thus, catalytically active copper components not detectable by X-ray diffraction would not be considered crystalline but "dispersed."

"Macropore volume" of the catalytic composite is herein defined as the cumulative pore volume of pores greater than about 350 A. diameter as determined by the mercury penetration method.

The catalytic composites for use in my invention should have a macropore volume from about 0.05 to 0.30 cubic centimeter per gram and, preferably, from about 0.10 to 0.25 cubic centimeter per gram.

Catalysts having the desird macropore volume are readily prepared by standard techniques utilizing commercially available materials.

The copper concentration in my catalysts is non-critical and can be varied over a wide range. However the catalytic composites, whatever the form of the copper component, generally have an elemental copper content ranging from about one to twenty percent based on the overall weight of the catalytic composite. The preferred range is about three to eight weight percent based on the catalytic composite—however other preparations are not excluded.

Particularly this invention is directed towards treating engine exhaust from automobiles to remove oxidizable constituents such as carbon monoxide and hydrocarbons.

Broadly this invention is applicable to all hydrocarbon combustion engines, whether internal combustion or gas turbine, and whether used in automobiles, aircraft, trucks, locomotives, ships, excavating machinery, etc., or affixed at stationary locations.

The hydrocarbon fuels may be gasoline, kerosene, fuel oil, gas, etc., either natural or manufactured.

The following example sets forth the best contemplated mode for carrying out my invention.

EXAMPLE

An aging reactor was developed that produces catalytic degradation and inactivation similar to that encountered in actual automobile exhaust and permits studies of catalyst aging in synthetic atmospheres of variable but controlled composition. Studies have shown correlation between catalyst aging in this reactor and aging in actual road tests. The aging reactor is, however, more reproducible because of better control of aging environment.

Feed lines of CO, $O_2$ and $N_2$ are each passed through a Brook Sho-Rate 150 rotameter with an integral flow controller. Each rotameter is calibrated by the water displacement method using the particular gas being accommodated. Saturators consisting of gas washing bottles with fritted glass plugs on the inlet tubes are used at room temperature (ca. 22° C.) for introducing components that are liquids, i.e., water, hydrocarbons, and halogenated hydrocarbons. The concentration of these liquid components in the vapor phase is calculated from the flow of $N_2$ through the saturator and the vapor pressure of the liquid at 220° C. The flow of $N_2$ through the saturators is usually quite low (<100 cc./min.) and saturation of $N_2$ with vapor of the liquid is assumed. The oxygen flow is varied by use of a solenoid value and a program timer.

The combined feeds including CO, $O_2$, $N_2$, hydrocarbons, and halogenated hydrocarbons are passed through a preheater consisting of a stainless steel tube 8 in. in length and 1 in. inside diameter, filled with inert ⅛ in. alumina balls and surrounded by a hinged-type tube furnace into a vertical reactor. The temperature of the feed stream is controlled at a point in the inlet line about 2 in. above the reactor, using a Wheelco 402 controller. A thermowell is positioned centrally in the catalyst bed to allow for determination of axial temperature profile. Both the control and probe thermocouples are Chromel-Alumel. Readout of the probe thermocouple is performed on a Sim-Ply-Trol pyrometer.

The reactor is made of stainless steel, has an inside diameter of 1⅛ in., accommodates a catalyst volume of 35 cc., and the entire reactor and inlet lines are lagged with asbestos insulation. No external heating is applied to the reactor section housing the catalyst (this simulates the similar condition that would exist in a catalytic muffler in an automobile).

Sampling lines are located before and after the reactor and analyses of CO content in the feed and effluent were made using a 5 A. molecular sieve column in a Aminco chromatograph. According to the CO analyses the CO content of the feed varies from run to run within the range of about 6.0 to 6.6%. A typical condition for most runs in the aging reactor is a gas inlet temperature of 290° C., and a temperature maximum in the catalyst bed of 620°–650° C. These temperature conditions as well as the space velocity and linear flow velocity were maintained at values in the range commonly encountered in a catalytic muffler.

The table shows percent CO conversion for low crystalline Cu oxide on alumina composites with varying macropore volume as a function of time. It may be seen that at about the same Cu content level the low crystalline catalysts show significant differences in the inactivation rates which can be correlated with the macropore volume.

$Cu(NO_3)_2 \cdot 3H_2O$. The impregnates are dried at 120° C., for periods ranging from 2 to 12 hrs. and then calcined at 500° C., for 4 to 12 hrs.

The percent crystalline Cu oxide content is determined by X-ray diffraction analysis with a General Electric XRD-5 Diffractometer, using Ni filtered Cu $K\alpha$ radiation. The integrated intensity of a prominent characteristic peak of Cu oxide is determined both in the catalyst and in pure crystalline Cu oxide under the same conditions. The ratio of these integrated intensities constitutes the relative intensity. An absorption correction for the alumina is applied to convert the relative intensity to the weight fraction of crystalline Cu oxide actually present in the catalytic composite.

Cu contents of catalysts are determined by an iodometric method after the sample is digested with sulfuric acid. Potassium iodide is added to the solution and the free iodine titrated with 0.10 N sodium thiosulfate solution.

Macropore size distribution data is obtained using an Aminco-Winslow mercury porosimeter, Model 5–7107 with a pressure range of 0–5,000 p.s.i.g. The method is similar to that described by L. E. Drake and H. L. Ritter, Ind. Eng. Chem., Anal. Ed., 17,787 (1945). The procedure used is as follows:

(1) A weighed sample is placed in the penetrometer tube and this in turn is placed in the filling device and evacuated with a vacuum pump for at least 0.5 hr. or until the pressure is below 0.05 min.

(2) Mercury is admitted to the filling device and then air so that the air pressure will force the mercury into the penetrometer at a pressure of 1 atmosphere (less the mercury head pressure).

(3) The penetrometer tube is then removed from the filling device and placed in the pressure vessel. (If the skeletal density is desired, the mercury-filled penetrometer is weighed before placing in the pressure vessel.)

(4) The pressure vessel is completely filled with isopropyl alcohol and then sealed.

(5) The system is pressurized by manually screwing in a piston in the pressure generator. The pressure is measured with test gauges and the mercury penetration is observed by the rise of the mercury-alcohol interface in the calibrated penetrometer stem. The mercury penetration at 5000 p.s.i.g., yields the total macropore volume, as defined (pores <350 A.).

The correlation between the rates of inactivation and the macropore volume might be explained as follows.

It is known that under conditions of highest activity (i.e., high temperature) reactions on porous catalysts will tend to be rate controlled by external mass transfer; at somewhat lower activities (i.e., lower temperatures) intraparticle diffusion will be rate limiting; and at still lower activity the chemical kinetics will be rate controlling. Thus, it seems plausible that as inactivation occurs the kinetics enter a regime in which the rate is strongly

TABLE

| Catalytic composite | Percent crystalline Cu oxide | Percent Cu | Macropore volume, cc./gm. | Percent CO conversion | | | |
|---|---|---|---|---|---|---|---|
| | | | | 1 hr. | 20 hrs. | 50 hrs. | 90 hrs. |
| A, Cu oxide on alumina | <1 | 5.4 | 0.184 | 100 | 98 | 97 | 96 |
| B, Cu oxide on alumina | <1 | 5.4 | 0.048 | 98 | 90 | 84 | |
| C, Cu oxide on alumina | <1 | 5.8 | 0.013 | 96 | 77 | | |
| D, Cu oxide on alumina | <1 | 4.2 | 0.243 | 100 | 100 | 99 | 98 |
| E, Cu oxide on alumina | <1 | 4.2 | 0.108 | 100 | 95 | 90 | |
| F, Cu oxide on alumina | <1 | 4.4 | 0.011 | 99 | 68 | | |

The catalysts are prepared by impregnation of preformed alumina supports[1] with an aqueous solution of

[1] Examples of supports employed include Kaiser Alumina KA101 (a commercial desiccant composed principally of eta alumina in the form 5 x 8 mesh nodules), Kaiser Alumina XA331 (an eta alumina similar to KA101 but harder and with a lower macropore volume), Kaiser Alumina XA46 (an eta alumina similar to KA101 but harder and with a much lower sodium content), Alcoa Alumina F110 (a chi alumina in the form of ⅛ in. balls which is very hard and has a low macropore volume), etc.

affected by intraparticle diffusion. With all other factors relatively constant one can conclude that a higher diffusivity deriving from a larger macropore volume contributes to a high level of activity. While the foregoing is a possible explanation of the advantages obtained in the practice of this invention, it will be understood that I do not wish to be limited by this or other theory of operation

What is claimed is:

1. A process for the catalytic oxidation of exhaust which comprises passing the oxidizable constituents present in the exhaust from a hydrocarbon combustion engine over a catalytic composite comprising a catalytically active copper component contained on a suitable base which catalytically active component has a crystalline content of less than about four percent based on the weight of the catalytic composite and where the catalytic composite has a macropore volume as determined by mercury penetration of about 0.05 to 0.30 cubic centimeter per gram.

2. The process of claim 1 where the catalytically active copper component is copper oxide.

3. The process of claim 1 where the catalyst base is alumina.

4. The process of claim 1 where the copper component has a crystalline content of less than about two percent based on the weight of the catalytic composite.

5. The process of claim 1 where the catalytic composite has a macropore volume of about 0.10 to 0.25 cubic centimeter per gram.

6. A process for the catalytic oxidation of exhaust which comprises passing the oxidizable constituents present in the exhaust from a hydrocarbon combustion engine over a catalytic composite comprising as a catalytically active component copper oxide contained on an alumina base which catalytically active component has a crystalline content of less than about two percent based on the weight of the catalytic composite and where the catalytic composite has a macropore volume as determined by mercury penetration of about 0.10 to 0.25 cubic centimeter per gram.

7. The process of claim 6 where the oxidizable constituents are carbon monoxide and hydrocarbons.

8. The process of claim 6 where the hydrocarbon combustion engine is an internal combustion automobile engine.

9. A catalytic composite comprising a catalytically active copper component contained on a suitable base which catalytically active component has a crystalline content of less than about four percent based on the weight of the catalytic composite and where the catalytic composite has a macropore volume as determined by mercury penetration of about 0.05 to 0.30 cubic centimeter per gram.

10. The catalyst of claim 9 where the catalytically active copper component is copper oxide.

11. The catalyst of claim 9 where the catalyst base is alumina.

12. The catalyst of claim 9 where the copper component has a crystalline content of less than about two percent based on the weight of the catalytic composite.

13. The catalyst of claim 9 where the catalytic composite has a macropore volume of about 0.10 to 0.25 cubic centimeter per gram.

14. A catalytic composite comprising as a catalytically active component copper oxide contained on alumina base which catalytically active component has a crystalline content of less than about two percent based on the weight of the catalytic composite and where the catalytic composite has a macropore volume as determined by mercury penetration of about 0.10 to 0.25 cubic centimeter per gram.

References Cited

UNITED STATES PATENTS

| | | | |
|---|---|---|---|
| 1,345,323 | 6/1920 | Frazer et al. | 252—476 |
| 2,965,562 | 12/1960 | Gardner | 252—467 |
| 3,179,488 | 4/1965 | Appell | 252—476 |
| 3,228,746 | 1/1966 | Howk et al. | 252—467 |
| 3,230,034 | 1/1966 | Stiles | 252—467 |
| 3,231,516 | 1/1966 | Gary | 252—476 |
| 3,284,370 | 11/1966 | Clifford et al. | 252—463 |
| 2,688,603 | 7/1954 | Baldwin | 252—476 X |
| 3,025,132 | 3/1962 | Innes | 23—2 |

PATRICK P. GARVIN, *Primary Examiner.*

U.S. Cl. X.R.

252—463, 476

UNITED STATES PATENT OFFICE
CERTIFICATE OF CORRECTION

Patent No. 3,418,070                           December 24, 1968

James F. Roth

It is certified that error appears in the above identified patent and that said Letters Patent are hereby corrected as shown below:

In the heading to the printed specification, lines 4 and 5 "Monsanto Chemical Company" should read -- Monsanto Company --. Column 3, line 15, "220° C." should read -- 22° C. --. Columns 3 and 4, in the table, fifth column, line 2 thereof, "98" should read -- 99 --. Column 3, line 3 of footnote 1 thereof, after "form" insert -- of --; same footnote, line 5 thereof, after "XA46" insert -- 8 --.

Signed and sealed this 17th day of March 1970.

(SEAL)
Attest:

Edward M. Fletcher, Jr.                         WILLIAM E. SCHUYLER, JR.
Attesting Officer                                    Commissioner of Patents